US012791713B2

(12) United States Patent
Oh et al.

(10) Patent No.: US 12,791,713 B2

(45) Date of Patent: Nov. 10, 2026

(54) SYSTEM AND METHOD OF TRACKING OBJECT FOR MOBILITY EQUIPPED WITH LIDAR AND CAMERA

(71) Applicants: Hyundai Motor Company, Seoul (KR); Kia Corporation, Seoul (KR)

(72) Inventors: Sanghyeon Oh, Seoul (KR); Hyuntek Lim, Hwaseong-si (KR); Dong Hwan Kwak, Hwaseong-si (KR); Jonghyeok Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 314 days.

(21) Appl. No.: 18/409,097

(22) Filed: Jan. 10, 2024

(65) Prior Publication Data

US 2025/0085427 A1 Mar. 13, 2025

(30) Foreign Application Priority Data

Sep. 8, 2023 (KR) ........................ 10-2023-0119485

(51) Int. Cl.

*G01S 17/66* (2006.01)
*G01S 7/4865* (2020.01)
*G01S 17/86* (2020.01)
*G01S 17/931* (2020.01)
(Continued)

(52) U.S. Cl.

CPC ............ *G01S 17/66* (2013.01); *G01S 7/4865* (2013.01); *G01S 17/86* (2020.01); *G01S 17/931* (2020.01); *G06T 7/248* (2017.01); *G06T 7/74* (2017.01); *G06T 2207/10028* (2013.01); *G06T 2207/20084* (2013.01)

(58) Field of Classification Search

CPC .......... G01S 17/66; G01S 17/86; G01S 17/89; G01S 17/931; G01S 7/4808; G01S 7/4865; G06T 2207/10016; G06T 2207/10028; G06T 2207/20084; G06T 2207/30252; G06T 7/246; G06T 7/248; G06T 7/74

See application file for complete search history.

(56) References Cited

U.S. PATENT DOCUMENTS

| | | | |
|---|---|---|---|
| 5,475,494 A | 12/1995 | Nishida et al. |
| 9,709,665 B2 | 7/2017 | Takasago |
| 10,052,542 B2 | 8/2018 | Tuxen et al. |

(Continued)

FOREIGN PATENT DOCUMENTS

| | | |
|---|---|---|
| JP | H06293236 A | 10/1994 |
| JP | 2003030628 A | 1/2003 |

(Continued)

*Primary Examiner* — Thien M Le

(74) *Attorney, Agent, or Firm* — Slater Matsil, LLP

(57) ABSTRACT

In an embodiment, a method of tracking an object includes acquiring an image by a camera, starting, by a controller, an object search for the entire image through an object search algorithm, determining, by the controller, whether the object search is completed, in response to determining that the object search is not completed, predicting, by the controller, an object search range based on mobility movement data and Lidar data, and performing, by the controller, the object search on the predicted object search range through the object search algorithm. In an embodiment, a system of tracking an object for a mobility is configured to perform the method of tracking an object for a mobility.

20 Claims, 7 Drawing Sheets

(51) Int. Cl.
*G06T 7/246* (2017.01)
*G06T 7/73* (2017.01)

(56) References Cited

U.S. PATENT DOCUMENTS

| | | | | |
|---|---|---|---|---|
| 10,315,093 | B2 | 6/2019 | Tuxen et al. | |
| 10,441,863 | B2 | 10/2019 | Tuxen et al. | |
| 10,471,328 | B2 | 11/2019 | Tuxen et al. | |
| 11,135,495 | B2 | 10/2021 | Tuxen et al. | |
| 11,252,329 | B1 * | 2/2022 | Cier | H04N 23/53 |
| 11,291,902 | B2 | 4/2022 | Tuxen et al. | |
| 11,632,602 | B2 * | 4/2023 | Cier | G01C 21/383 348/36 |
| 2013/0305805 | A1 | 11/2013 | Ahn et al. | |
| 2022/0224833 | A1 * | 7/2022 | Cier | G01C 21/383 |
| 2023/0075425 | A1 * | 3/2023 | Muehlenstaedt | G06N 3/084 |
| 2023/0245323 | A1 | 8/2023 | Araki et al. | |
| 2023/0410656 | A1 * | 12/2023 | Lu | G08G 1/163 |
| 2023/0417572 | A1 * | 12/2023 | Donderici | G01C 21/3848 |
| 2024/0265547 | A1 * | 8/2024 | Cui | A01B 69/008 |
| 2025/0118041 | A1 * | 4/2025 | Gueye | A63F 13/61 |
| 2025/0346249 | A1 * | 11/2025 | Borse | B60W 60/001 |
| 2025/0353489 | A1 * | 11/2025 | Zarringhalam | B60W 30/09 |
| 2026/0004456 | A1 * | 1/2026 | Verbeke | G06T 7/74 |

FOREIGN PATENT DOCUMENTS

| | | | |
|---|---|---|---|
| JP | 2011150633 | A | 8/2011 |
| JP | 2011248445 | A | 12/2011 |
| JP | 2015028440 | A | 2/2015 |
| JP | 2015506516 | A | 3/2015 |
| JP | 2016151833 | A | 8/2016 |
| JP | 2020529686 | A | 10/2020 |
| JP | 2023110364 | A | 8/2023 |
| KR | 20180035240 | A | 4/2018 |
| KR | 20220055236 | A | 5/2022 |

* cited by examiner

SYSTEM AND METHOD OF TRACKING OBJECT FOR MOBILITY EQUIPPED WITH LIDAR AND CAMERA

CROSS-REFERENCE TO RELATED APPLICATIONS

This application claims priority to and the benefit of Korean Patent Application No. 10-2023-0119485 filed in the Korean Intellectual Property Office on Sep. 8, 2023, the entire contents of which are incorporated herein by reference.

TECHNICAL FIELD

The present disclosure relates to a system and a method of tracking an object for a mobility equipped with a Lidar and a camera.

BACKGROUND

An indoor autonomous mobility may drive by tracking a specific object. To track the specific object, the indoor autonomous mobility mainly searches for objects through an artificial neural network. More specifically, the indoor autonomous driving mobility acquires images using a camera, searches for the objects in the acquired images through the artificial neural network, and when the object search is completed, generates a bounding box including the searched objects to determine positions of the searched objects (e.g., locations of feature points).

However, while a maximum speed of searching for the objects through the artificial neural network is 30 FPS, a control cycle of sensors such as an inertial measurement unit (IMU) in the mobility is 10 ms (=100 FPS), so there is difficulty in fusing sensor data with object search logic. In addition, there may be difficulty in performing the object search in real time through the artificial neural network in an embedded system with low computational performance due to absence of a graphics processing unit (GPU).

Furthermore, when the object tracking relies on a remote system, communication between the remote system and the mobility is cut off for a long time, or when the mobility moves significantly differently from a planned path, there is difficulty in the object tracking even when the communication with the remote system is resumed.

The above information disclosed in this Background Art is only for enhancement of understanding of the background of the disclosure and therefore it may contain information that is not necessarily the prior art that is already publicly known.

SUMMARY

The present disclosure relates to a system and a method of tracking an object for a mobility, and more particularly, to a system and a method of tracking an object for a mobility equipped with a Lidar and a camera capable of tracking the object in real time by predicting an object search range based on Lidar data and mobility movement data between object search times through an artificial neural network.

An embodiment of the present disclosure provides a system and a method of tracking an object for a mobility equipped with a Lidar and a camera capable of tracking the object in real time by predicting an object search range based on Lidar data and mobility movement data between object search times through an artificial neural network.

According to an embodiment, a system of tracking an object for a mobility includes a Lidar mounted on the mobility and configured to detect Lidar data, a movement data sensor mounted on the mobility and configured to detect mobility movement data, a camera mounted on the mobility and configured to acquire a front image of the mobility, and a controller configured to receive the Lidar data from the Lidar, receive the mobility movement data from the movement data sensor, receive the image from the camera, and search for the object from the received image through an object search algorithm, in which the controller is configured to predict a location of a first bounding box based on a location of a bounding box and a previous speed of the mobility before completing the object search for the entire image through the object search algorithm, predict a location of a second bounding box based on the location of the bounding box and a reference Lidar data for a reference Lidar point on the image, predict a location of a final bounding box based on the location of the first bounding box and the location of the second bounding box, and perform the object search on the final bounding box through the object search algorithm.

When it is determined that the object exists within the final bounding box in response to performing the object search on the final bounding box, the controller may be further configured to determine the location of the object.

When it is determined that no object exists within the final bounding box in response to performing the object search on the final bounding box, the controller may be further configured to move the final bounding box by a set pixel and perform the object search on the moved final bounding box again.

When no object exists within the final bounding box even after the final bounding box is moved the set number of times, the controller may perform the object search on the entire image through the object search algorithm.

The controller may be configured to convert an amount of change in the reference Lidar data into an amount of change in pixel data, and predict the location of the second bounding box based on the amount of change in the pixel data.

The controller may be configured to filter the first bounding box and the second bounding box to predict the location of the final bounding box.

The reference Lidar point may be at least one of both end points on the image.

When the previous speed of the mobility is not stored or the bounding box does not exist, the controller may perform the object search on the entire image through the object search algorithm.

According to an embodiment, a method of tracking an object for a mobility may include acquiring an image by a camera, starting, by a controller, an object search for the entire image through an object search algorithm, determining, by the controller, whether the object search is completed, when it is determined that the object search is not completed, predicting, by the controller, an object search range based on mobility movement data and Lidar data, and performing, by the controller, the object search on the predicted object search range through the object search algorithm.

The predicting an object search range based on mobility movement data and Lidar data may include predicting a location of a first bounding box based on a location of a bounding box and a previous speed of the mobility, predicting a location of a second bounding box based on the location of the bounding box and reference Lidar data for a reference Lidar point on the image, and predicting a location of a final bounding box as the object search range based on the location of the first bounding box and the location of the second bounding box.

The method may further include, when it is determined that the object exists within the final bounding box, determining, by the controller, a location of the object.

The method may further include, when it is determined that no object exists in the final bounding box, moving, by the controller, the final bounding box by a set pixel, and re-performing the object search on the moved final bounding box using the object search algorithm.

The method may further include, when no object exists within the final bounding box even after the final bounding box is moved and the object search is repeated the set number of times, performing, by the controller, the object search on the entire image through the object search algorithm.

The predicting of the location of the second bounding box based on the location of the bounding box and the reference Lidar data for the reference Lidar point on the image may include transforming an amount of change in the reference Lidar data into an amount of change in pixel data, and predicting the location of the second bounding box based on the location of the bounding box and the amount of change in the pixel data.

The predicting a location of a final bounding box as the object search range based on the location of the first bounding box and the location of the second bounding box may further include filtering the first bounding box and the second bounding box.

The reference Lidar point may be at least one of both end points on the image.

The method may further include, when the previous speed of the mobility is not stored or the bounding box does not exist, performing, by the controller, the object search on the entire image through the object search algorithm.

According to an embodiment of the present disclosure, it is possible to track the object in real time by predicting the object search range based on the Lidar data and the mobility movement data between the object search times through the artificial neural network.

In addition, in an embodiment, it is possible to perform real-time object tracking through efficient calculation without improving system specifications.

Furthermore, in an embodiment, it is possible to accurately track the location of the object in real time with an efficient calculation amount by filtering the predicted object search range based on the Lidar data and the predicted object search range based on the mobility movement data to determine a final object search range.

Other effects that may be obtained or are predicted by an embodiment can be explicitly or implicitly described in a detailed description of an example embodiment. That is, various effects that are predicted according to an embodiment are described in the following detailed description.

BRIEF DESCRIPTION OF THE DRAWINGS

Embodiments of the present specification may be better understood by referring to the following description in conjunction with the accompanying drawings, where like reference numerals can refer to identical or functionally similar elements, in which.

Figure 1:
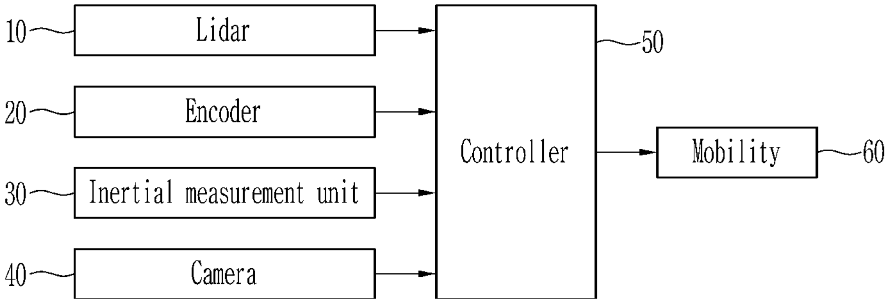
FIG. 1 is a block diagram of a system of tracking an object for a mobility according to an embodiment of the present disclosure.

It can be understood that the drawings referenced above are not necessarily drawn to scale, and present rather simplified representations of various features illustrating basic principles of the present disclosure. For example, specific design features of an embodiment of the present disclosure, including specific dimensions, direction, location, and shape, can be determined in part by specific intended applications and use environments.

DETAILED DESCRIPTION OF ILLUSTRATIVE EMBODIMENTS

The terminology used herein is for the purpose of describing particular embodiments only, and is not intended to necessarily limit the present disclosure. As used herein, singular forms can also include plural forms, unless the context clearly dictates otherwise. The terms "comprises" and/or "comprising," specify the cited features, integers, steps, operations, elements, and/or the presence of components when used herein, but it can also be understood that these terms do not exclude the presence or addition of one or more of other features, integers, steps, operations, elements, components, and/or groups thereof. As used herein, the term "and/or" can include any one or all combinations of the associated listed items.

As used herein, "mobility" or "of mobility" or other similar terms can include passenger vehicles including sport utility vehicles (SUVs), general land mobility including a bus, a truck, various commercial vehicles, etc., marine mobility including various types of boats and ships, and aerial mobility including aircraft, a drone, etc., and can include all objects that may move by receiving power from a power source. In addition, as used herein, "mobility" or "of mobility" or other similar terms can be understood as including hybrid mobility, electric mobility, plug-in hybrid mobility, hydrogen-powered mobility, and other alternative fuel (e.g., fuels derived from resources other than oil) mobility. As referred to herein, the hybrid mobility can include mobility with two or more power sources such as gasoline power and electric power mobility. Mobility according to an embodiment of the present disclosure can include mobility driven somewhat autonomously and/or automatically as well as mobility driven manually.

Additionally, it can be understood that one or more of the methods below or aspects thereof may be executed by at least one or more controllers. The term "controller" may refer to a hardware device including a memory and a processor, or a plurality thereof. The memory can be configured to store program instructions, and the processor can be specifically programmed to execute the program instructions to perform one or more processes described in more detail below. The controller may control operations of units, modules, parts, devices, or the like, as described herein. It can be also understood that methods below may be executed by an apparatus including a controller in conjunction with one or more other components, as will be appreciated by those skilled in the art.

In addition, the controller of an embodiment of the present disclosure may be implemented as a non-transitory computer-readable recording medium including executable program instructions executed by a processor or a plurality of processors. Examples of the computer-readable recording medium can include ROM, RAM, compact disk (CD) ROM, magnetic tapes, floppy disks, flash drives, smart cards, optical data storage devices, or combinations thereof, but are not necessarily limited thereto. The computer-readable recording medium may also be distributed throughout a computer network so that the program instructions may be stored and executed in a distributed manner, for example, on a telematics server or a controller Area Network (CAN).

Hereinafter, an embodiment of the present disclosure will be described in detail with reference to the accompanying drawings.

FIG. 1 is a block diagram of a system of tracking an object for a mobility according to an embodiment of the present disclosure.

As illustrated in FIG. 1, a system of tracking an object for a mobility according to an embodiment of the present disclosure includes a Lidar 10, an encoder 20, an inertial measurement unit 30, a camera 40, a controller 50, and a mobility 60.

The Lidar 10 can be mounted on the mobility 60, and may measure a time from a time point when a laser pulse is irradiated to a front of the mobility 60 to a time point when the laser pulse is reflected from an object within a measure range of the Lidar 10 and returned to detect information on the object, such as a distance from the Lidar 10 to the object and a direction, a speed, a temperature, a material distribution, and concentration characteristics of the object. The object may be another mobility, persons, things, etc., existing outside the mobility 60 equipped with the Lidar 10, but embodiments of the present disclosure are not particularly limited to a type of the object. The Lidar 10 may be connected to the controller 50 to detect Lidar data (e.g., data of a plurality of Lidar points) within the measurement range and transmit the Lidar data to the controller 50.

The encoder 20 can measure information on a rotation of a drive motor or a wheel provided in the mobility 60. The encoder 20 may be connected to the controller 50 and transmit the information on the measured rotation of the drive motor or the wheel to the controller 50. The controller 50 may calculate mobility movement data, such as a movement speed and/or a movement distance of the mobility 60, based on the information on the rotation of the drive motor or the wheel.

The inertial measurement unit 30 can measure information on a movement status of the mobility 60, including the speed, direction, gravity, and acceleration of the mobility 60. The inertial measurement unit 30 may be connected to the controller 50 and transmit the information on the measured movement status of the mobility 60 to the controller 50. The controller 50 may detect or supplement the mobility movement data based on the information on the movement status of the mobility 60.

It is illustrated that both the encoder 20 and the inertial measurement unit 30 can be used as movement data sensors that detect the movement data of the mobility 60, but in some embodiments only one of the encoder 20 and the inertial measurement unit 30 may be used as the movement data sensor. In addition, the movement data sensor is not necessarily limited to the encoder 20 and/or the inertial measurement unit 30, and can detect and provide the movement data of the mobility 60.

The camera 40 can be mounted on the mobility 60 and acquire a front image of the mobility 60 within the measurement range of the camera 40. The camera 40 may be connected to the controller 50 and transmit the acquired image(s) to the controller 50. The image(s) can be composed of pixel data including a plurality of pixels. A size of the pixel data of the image may be (N*M), where N and M are natural numbers.

The controller 50 can receive the Lidar data from the Lidar 10, receive the information on the rotation of the drive motor or the wheel from the encoder 20, receive the information on the movement status of the mobility 60 from the inertial measurement unit 30, and receive the front image of the mobility 60 through the camera 40.

The controller 50 can be configured to search for the object (e.g., feature point) in the image through an object search algorithm, such as an artificial neural network based on the received image, generate a bounding box when the object in the image is searched, and determine a location of the object (e.g., the feature point) within the bounding box.

The controller 50 can be configured to detect mobility movement data based on the information on the rotation of the drive motor or the wheel received from the encoder 20 or the information on the movement status of the mobility 60 can be received from the inertial measurement unit 30, and can predict a location of a first bounding box in which the object will be searched based on the mobility movement data. In addition, the controller 50 can be configured to predict a location of a second bounding box to search for the object based on the Lidar data received from the Lidar 10. Furthermore, the controller 50 can be configured to filter the location of the first bounding box and the location of the second bounding box to predict a location of a final bounding box, determine whether the object (e.g., the feature point) exists within the predicted final bounding box, and determine the location of the object when the object exists within the final bounding box.

The controller 50 can be equipped with one or more microprocessors, and the one or more microprocessors may be programmed to perform each step of a method of tracking an object according to an embodiment of the present disclosure.

The controller 50 may be connected to the mobility 60 to control the movement of the mobility 60 based on the object tracking results. For example, the controller 50 may control the mobility 60 to follow the object or control the mobility 60 to avoid the object.

Figure 2:
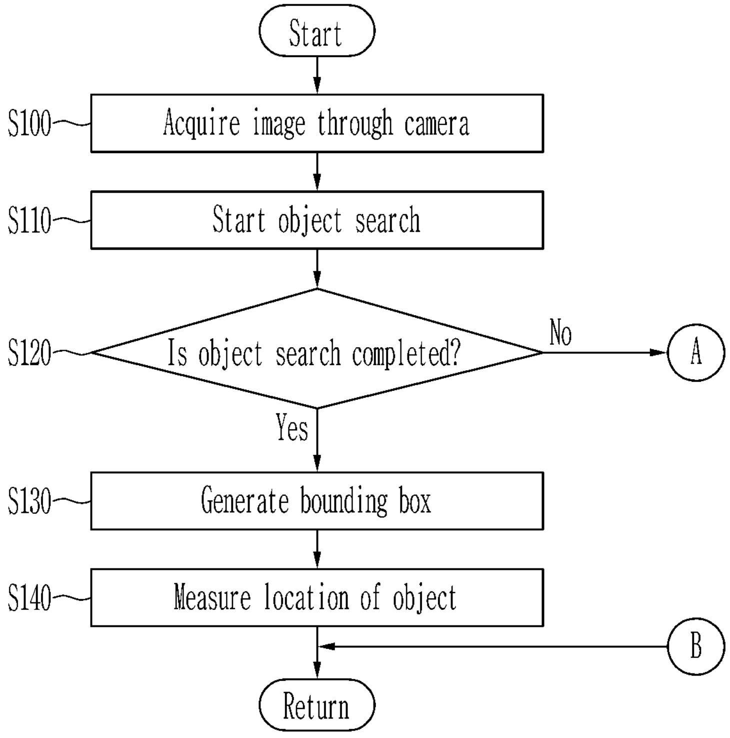
FIGS. 2 and 3 are flowcharts of a method of tracking an object for a mobility according to an embodiment of the present disclosure.
Figure 3:
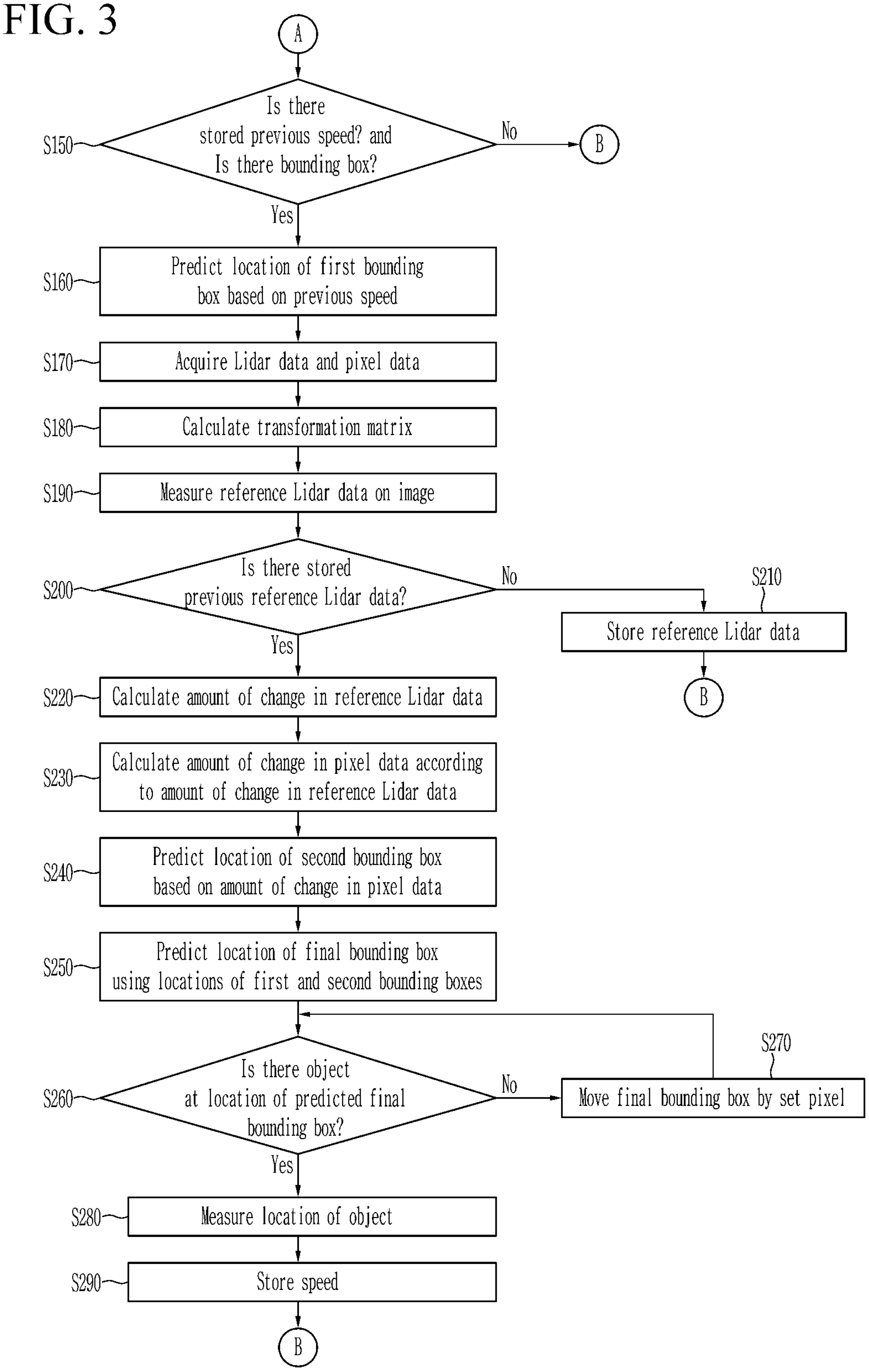
Figure 4:
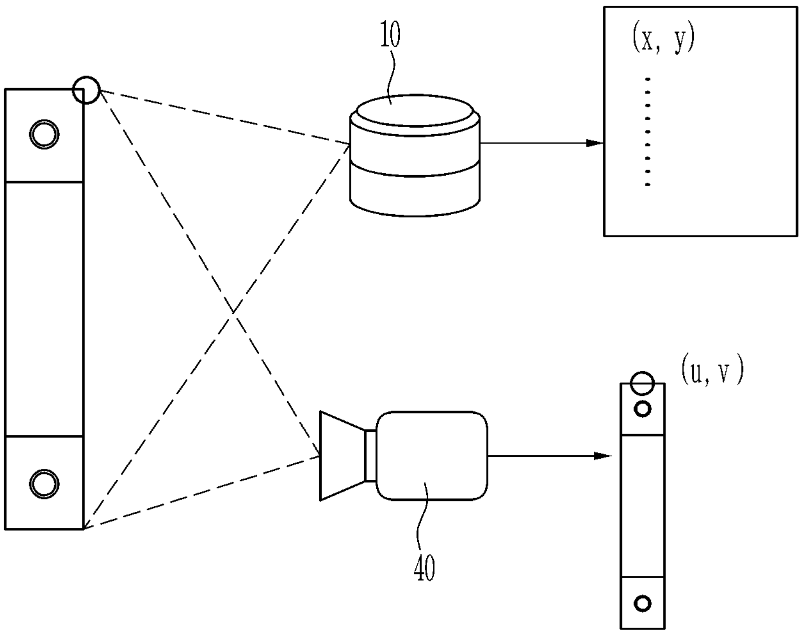
FIG. 4 is a diagram schematically illustrating a relationship between Lidar data and pixel data, according to an embodiment of the present disclosure.
Figure 5:
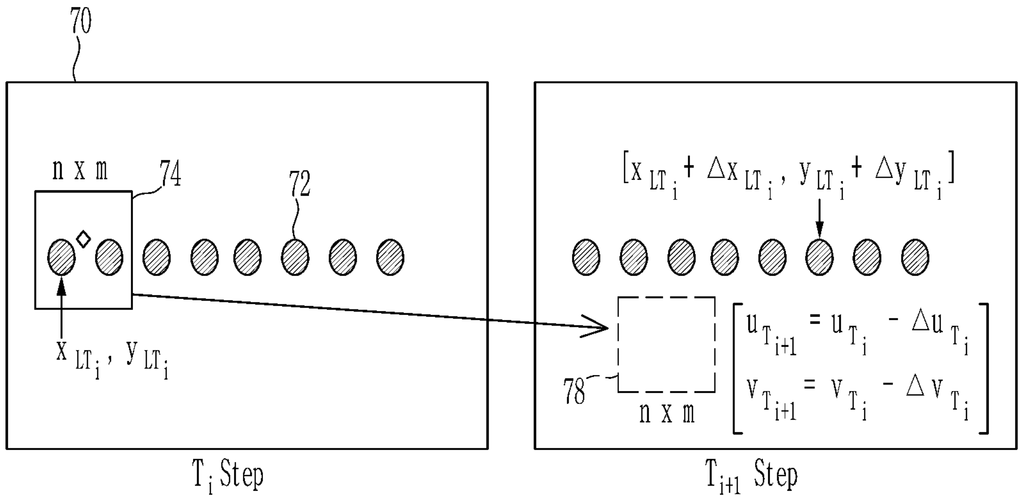
FIG. 5 is a schematic diagram illustrating predicting an object search range based on Lidar data, according to an embodiment of the present disclosure.
Figure 6:
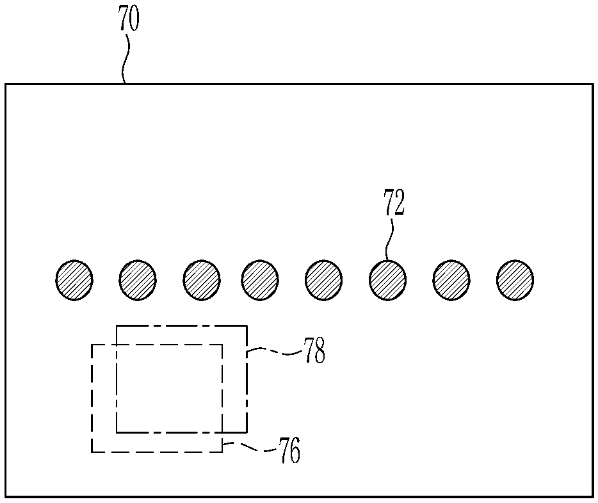
FIG. 6 is a schematic diagram illustrating an object search range predicted based on Lidar data and the object search range predicted based on mobility movement data, according to an embodiment of the present disclosure.
Figure 7:
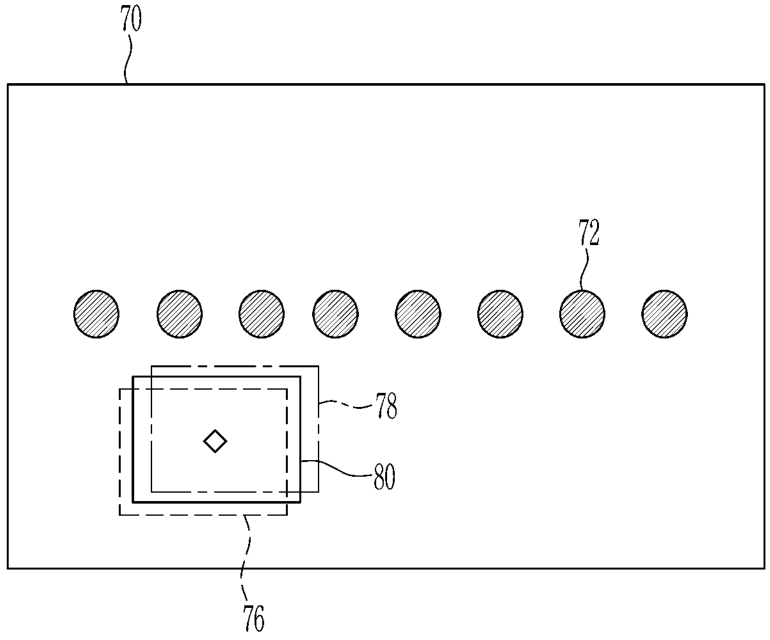
FIG. 7 is a schematic diagram illustrating a final object search range obtained by filtering an object search range predicted based on Lidar data and the object search range predicted based on mobility movement data, according to an embodiment of the present disclosure.

FIGS. 2 and 3 are flowcharts of a method of tracking an object for a mobility according to an embodiment of the present disclosure. FIG. 4 is a diagram schematically illustrating a relationship between Lidar data and pixel data, according to an embodiment of the present disclosure. FIG. 5 is a schematic diagram illustrating predicting an object search range based on Lidar data, according to an embodiment of the present disclosure. FIG. 6 is a schematic diagram illustrating an object search range predicted based on Lidar data and the object search range predicted based on mobility movement data, according to an embodiment of the present disclosure. FIG. 7 is a schematic diagram illustrating a final object search range obtained by filtering an object search range predicted based on Lidar data and the object search range predicted based on mobility movement data, according to an embodiment of the present disclosure.

In FIGS. 4 and 5, (x, y) represents the Lidar data detected by the Lidar 10, and (u, v) represents pixel data detected by the camera 40. In FIGS. 5 to 7, reference numeral '70' represents the image detected by the camera 40, and reference numeral '72' exemplarily represents a Lidar pointer on the image 70.

As illustrated in FIG. 2, a method of tracking an object for a mobility according to an embodiment of the present disclosure can start by acquiring the front image from the mobility 60 through the camera 40 at operation S100. For example, the camera 40 can acquire the front image from the mobility 60 at a set period and transmit the acquired image to the controller 50. The image can be composed of the pixel data of (N*M) size.

The controller 50 can start to search for the object within the image at operation S110. For example, the controller 50 can start to search for the feature points of the objects existing in the image through an artificial neural network or the like. Thereafter, the controller 50 can determine whether the object search through the artificial neural network or the like is completed at operation S120.

When it is determined at operation S120 that the object search is completed, the controller 50 can generate the bounding box including the searched object (e.g., the feature point) at operation S130 and determine the location of the object (e.g., the feature point) at operation S140. A size of the bounding box may be (n*m), where n is a natural number less than N, and m is a natural number less than M. However, the size of the bounding box is not necessarily limited thereto.

When it is determined at operation S120 that the object search is not completed, the controller 50 can determine whether the stored previous speed of the mobility 60 exists and whether the stored bounding box exists at operation S150, as illustrated in FIG. 3. That is, the controller 50 can determine whether the speed of the mobility 60 detected at a previous time (i.e., the previous location determining time) and stored in the memory exists, and whether the bounding box generated at the previous time and whose location is stored in the memory exists.

When it is determined at operation S150 that the previous speed of the mobility 60 stored in the memory does not exist or the bounding box does not exist, the method of tracking an object for a mobility according to an embodiment of the present disclosure ends, and the controller 50 can perform the object search on the entire image through the object search algorithm such as the artificial neural network.

When it is determined at operation S150 that the previous speed and the bounding box of the mobility 60 stored in the memory exist, the controller 50 can predict the location of the first bounding box 76 based on the previous speed of the mobility 60 at operation S160. As illustrated in FIGS. 5 and 6, the controller 50 can predict an amount of movement of the mobility 60 based on the previous speed of the mobility 60 and a time interval between the previous time and the current time, and predict the location of the first bounding box 76 by moving the bounding box 74 stored in the memory based on the predicted amount of movement of the mobility 60.

In addition, the controller 50 can acquire the Lidar data (x, y) from the Lidar 10 and the image from the camera 40 to obtain the pixel data (u, v) at operation S170, and calculate a transformation matrix to convert the Lidar data into the pixel data based on the acquired Lidar data (x, y) and the pixel data (u, v) at operation S180. Because the Lidar 10 and the camera 40 are fixedly mounted on the mobility 60, the transformation matrix for transforming the Lidar data into the pixel data is generally constant. Using this fact, the transformation matrix for transforming the Lidar data into the pixel data may be calculated. For example, as illustrated in FIG. 4, the Lidar 10 can detect a vertex of the object as the Lidar data (x, y), and the camera 40 also can detect the same vertex of the same object as the pixel data (u, v). The controller 50 calculates the transformation matrix for transforming the Lidar data (x, y) into the pixel data (u, v) based on the Lidar data (x, y) and the pixel data (u, v).

Operations S170 and S180 may be optional steps. That is, when the transformation matrix for transforming the Lidar data into the pixel data is calculated, the transformation matrix may be stored in the memory. In addition, the transformation matrix may be calculated once when the Lidar 10 and the camera 40 are installed in the mobility 60, and may be stored in advance in the memory. Thereafter, the controller may load the transformation matrix stored in the memory instead of performing operations S170 and S180.

Thereafter, the controller 50 can position the reference Lidar data on the image at operation S190. That is, the controller 50 can position the reference Lidar data by positioning the reference Lidar point that is always located at a fixed location on the image 70. The reference Lidar point may be at least one of both end points on the image. A plurality of Lidar points may be located on the same horizontal plane, and among the plurality of Lidar points, the relative location of the Lidar point located at least one of both end points on the image is always the same. Accordingly, at least one of both end points on the image may be designated as the reference Lidar point, and the reference Lidar point may be acquired to position the reference Lidar data.

Thereafter, the controller 50 can determine whether the previous reference Lidar data stored in the memory exists at operation S200. That is, the controller 50 can determine whether the reference Lidar data for the same reference Lidar point is positioned and stored at a previous time.

When it is determined at operation S200 that the previous reference Lidar data does not exist, the controller 50 can store the reference Lidar data positioned at the current time at operation S210, the method of tracking an object for a mobility according to an embodiment of the present disclosure ends, and the controller 50 can perform the object search on the entire image through the object search algorithm, such as the artificial neural network.

When it is determined at operation S200 that the previous reference Lidar data exists, the controller 50 can store the reference Lidar data positioned at the current time and calculate an amount of change in the reference Lidar data based on the current time and the previous reference Lidar stored in the memory at operation S220. In addition, using the transformation matrix, the controller 50 can calculate the amount of change in the pixel data according to the amount of change in the reference Lidar data at operation S230. As described above, because the Lidar 10 and the camera 40 are fixedly mounted on the mobility 60, the amount of change in the pixel data corresponds to the amount of change in the location of the mobility 60. Accordingly, the controller 50 can calculate the amount of change in the pixel data to predict the amount of movement of the mobility 60.

Thereafter, as illustrated in FIG. 5, the controller 50 can predict the location of the second bounding box 78 based on the amount of change in the pixel data at operation S240. That is, the controller 50 can predict the location of the second bounding box 78 by moving the bounding box 74 stored in the memory according to the movement amount of the mobility 60 predicted based on the reference Lidar data.

As illustrated in FIGS. 6 and 7, the controller 50 can filter the first boundary box 76 predicted based on the movement data of the mobility 60 and the second boundary box 78 predicted based on the Lidar data (e.g., the reference Lidar data) to predict the location of the final boundary box 80 at operation S250. The filter for filtering the location of the bounding box is not necessarily limited thereto, and various filters such as a Kalman filter and a low-pass filter may be used.

When it is determined at the operation S250 that the location of the final bounding box 80 is predicted, the controller 50 can determine whether the object exists within the predicted final bounding box 80 at operation S260. That is, the controller 50 can search whether the feature points of the object exist within the final bounding box 80 whose size is reduced to (n*m) through the object search algorithm, such as the artificial neural network.

When it is determined at operation S260 that no object exists within the final bounding box 80, the controller 50 can move the final bounding box 80 by a set pixel and determine again whether the object exists within the moved final bounding box 80 at operation S260. When it is determined that the object does not exist within the final bounding box 80 even after moving the final bounding box 80 a set number of times, the method of tracking an object for a mobility according to an embodiment of the present disclosure ends and the controller 50 can perform the object search on the entire image through the artificial neural network, etc.

When it is determined at operation S260 that the object exists within the final bounding box 80, the controller 50 can determine the location of the object at operation S280. Accordingly, the controller 50 may continue to track the object using the object search range predicted based on the mobility movement data and the object search range predicted based on the Lidar data before the object search through the artificial neural network, etc., is completed. Thereafter, the controller 50 may end the method of tracking an object for a mobility according to an embodiment of the present disclosure.

As an optional step, the controller 50 may be used to store the movement data of the mobility 60 detected at the current time, especially the speed of the mobility 60 at operation S290 for example, and predict the location of the first bounding box 76 at a later time.

As such, according to an embodiment of the present disclosure, instead of executing the object search algorithm on the entire N*M image detected by the camera 40, the object search algorithm can be executed only on the final bounding box having the reduced n*m size, so it is possible to accurately track the location of the object in real time with an efficient calculation amount.

While this disclosure has been described in connection with what is presently considered to be practical example embodiments, it can be understood that the disclosure is not necessarily limited to the disclosed embodiments. On the contrary, the present disclosure is intended to cover various modifications and equivalent arrangements included within the spirit and scope of the appended claims.

What is claimed is:

1. A system of tracking an object for a mobility, comprising:

a Lidar mounted on the mobility and configured to detect Lidar data;

a movement data sensor mounted on the mobility and configured to detect mobility movement data;

a camera mounted on the mobility and configured to acquire a front image from the mobility; and a controller configured to receive the Lidar data from the Lidar, receive the mobility movement data from the movement data sensor, receive the image from the camera, and search for the object from the received image through an object search algorithm, wherein the controller is configured to predict a location of a first bounding box based on a location of a bounding box and a previous speed of the mobility before completing the object search for an entirety of the image through the object search algorithm, predict a location of a second bounding box based on the location of the first bounding box and a reference Lidar data for a reference Lidar point on the image, predict a location of a final bounding box based on the location of the first bounding box and the location of the second bounding box, and perform the object search on the final bounding box through the object search algorithm.

2. The system of claim 1, wherein in response to determining that the object exists within the final bounding box in response to performing the object search on the final bounding box, the controller is further configured to determine a location of the object.

3. The system of claim 2, wherein in response to determining that the object does not exist within the final bounding box in response to performing the object search on the final bounding box, the controller is further configured to move the final bounding box by a set pixel amount and perform the object search on the moved final bounding box again.

4. The system of claim 3, wherein in response to the object not existing within the final bounding box even after the final bounding box is moved a set number of times, the controller is configured to perform the object search on the entire image through the object search algorithm.

5. The system of claim 1, wherein the controller is configured to convert an amount of change in the reference Lidar data into an amount of change in pixel data, and predict the location of the second bounding box based on the amount of change in the pixel data.

6. The system of claim 1, wherein the controller is configured to filter the first bounding box and the second bounding box to predict the location of the final bounding box.

7. The system of claim 1, wherein the reference Lidar point is at least one of both end points on the image.

8. The system of claim 1, wherein in response to the previous speed of the mobility not being stored or the first bounding box not existing, the controller is configured to perform the object search on the entire image through the object search algorithm.

9. A method of tracking an object for a mobility, comprising:

acquiring an image;

starting an object search for an entirety of the image through an object search algorithm;

determining whether the object search is completed;

in response to determining that the object search is not completed, predicting an object search range based on mobility movement data and Lidar data, wherein predicting the object search range based on the mobility movement data and the Lidar data includes:

predicting a location of a first bounding box based on a previous speed of the mobility;

predicting a location of a second bounding box based on the location of the first bounding box and reference Lidar data for a reference Lidar point on the image; and predicting a location of a final bounding box as the object search range based on the location of the first bounding box and the location of the second bounding box; and performing the object search on the predicted object search range through the object search algorithm.

10. The method of claim 9, further comprising, in response to determining that the object exists within the final bounding box, determining a location of the object.

11. The method of claim 10, further comprising:

in response to determining that the object does not exist in the final bounding box, moving the final bounding box by a set pixel amount; and re-performing the object search on the moved final bounding box using the object search algorithm.

12. The method of claim 11, further comprising:

in response to the object not existing within the final bounding box even after the final bounding box is moved and the object search is repeated a set number of times, performing the object search on the entire image through the object search algorithm.

13. The method of claim 9, wherein the predicting of the location of the second bounding box based on the location of the first bounding box and the reference Lidar data for the reference Lidar point on the image comprises:

transforming an amount of change in the reference Lidar data into an amount of change in pixel data; and predicting the location of the second bounding box based on the location of the first bounding box and the amount of change in the pixel data.

14. The method of claim 9, wherein predicting the location of the final bounding box as the object search range based on the location of the first bounding box and the location of the second bounding box further comprises filtering the first bounding box and the second bounding box.

15. The method of claim 9, wherein the reference Lidar point is at least one of both end points on the image.

16. The method of claim 9, further comprising, in response to the previous speed of the mobility not being stored or the first bounding box not existing, performing the object search on the entire image through the object search algorithm.

17. A non-transitory computer-readable recording medium storing instructions that, when executed by one or more processors, cause the one or more processors to perform operations, the operations comprising:

acquiring an image;

starting an object search for an entirety of the image through an object search algorithm;

determining whether the object search is completed;

in response to determining that the object search is not completed, predicting an object search range based on mobility movement data and Lidar data, wherein the predicting the object search range based on mobility movement data and Lidar data includes:

predicting a location of a first bounding box based on a previous speed of the mobility;

predicting a location of a second bounding box based on the location of the first bounding box and reference Lidar data for a reference Lidar point on the image; and predicting a location of a final bounding box as the object search range based on the location of the first bounding box and the location of the second bounding box; and performing the object search on the predicted object search range through the object search algorithm.

18. The non-transitory computer-readable recording medium of claim 17, wherein the predicting of the location of the second bounding box based on the location of the first bounding box and the reference Lidar data for the reference Lidar point on the image comprises:

transforming an amount of change in the reference Lidar data into an amount of change in pixel data; and predicting the location of the second bounding box based on the location of the first bounding box and the amount of change in the pixel data.

19. The non-transitory computer-readable recording medium of claim 17, wherein predicting the location of the final bounding box as the object search range based on the location of the first bounding box and the location of the second bounding box further comprises filtering the first bounding box and the second bounding box.

20. The non-transitory computer-readable recording medium of claim 17, further comprising:

in response to determining that the object exists within the final bounding box:

determining a location of the object;

in response to determining that the object does not exist in the final bounding box:

moving the final bounding box by a set pixel amount, and re-performing the object search on the moved final bounding box using the object search algorithm; and in response to the object not existing within the final bounding box even after the final bounding box is moved and the object search is repeated a set number of times:

performing the object search on the entire image through the object search algorithm.

* * * * *